US012779729B2

(12) United States Patent
Weinkoetz et al.

(10) Patent No.: US 12,779,729 B2
(45) Date of Patent: Nov. 3, 2026

(54) BINDER FOR WOOD-BASED PANELS COMPRISING AMINO ACID POLYMER AND POLYALDEHYDE COMPOUND

(71) Applicant: BASF SE, Ludwigshafen am Rhein (DE)

(72) Inventors: Stephan Weinkoetz, Ludwigshafen am Rhein (DE); Gereon Antonius Sommer, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/875,759

(22) PCT Filed: Jun. 19, 2023

(86) PCT No.: PCT/EP2023/066455
§ 371 (c)(1),
(2) Date: Dec. 17, 2024

(87) PCT Pub. No.: WO2023/247437
PCT Pub. Date: Dec. 28, 2023

(65) Prior Publication Data

US 2025/0375918 A1 Dec. 11, 2025

(30) Foreign Application Priority Data

Jun. 22, 2022 (EP) .................................... 22180562

(51) Int. Cl.

| | |
|---|---|
| ***B27N 1/02*** | (2006.01) |
| ***B27N 1/00*** | (2006.01) |
| ***B27N 3/00*** | (2006.01) |
| ***B27N 3/02*** | (2006.01) |
| ***B27N 3/14*** | (2006.01) |
| ***B27N 3/20*** | (2006.01) |

(52) U.S. Cl.
CPC ........... *B27N 1/0209* (2013.01); *B27N 1/003* (2013.01); *B27N 3/002* (2013.01); *B27N 3/02* (2013.01); *B27N 3/14* (2013.01); *B27N 3/203* (2013.01)

(58) Field of Classification Search
CPC . B27N 3/002; B27N 3/02; B27N 3/04; B27N 3/12; B27N 3/203; C08G 12/06; C08G 69/50; C08L 77/04; C09J 177/04
USPC ...................................................... 428/292.4
See application file for complete search history.

(56) References Cited

U.S. PATENT DOCUMENTS

| | | | | |
|---|---|---|---|---|
| 2005/0051921 | A1 * | 3/2005 | Winterowd ............ | B27N 1/003 264/109 |
| 2011/0045966 | A1 | 2/2011 | Shooshtari et al. | |
| 2011/0262648 | A1 | 10/2011 | Lee et al. | |
| 2015/0299391 | A1 * | 10/2015 | Pacorel .................. | C08G 73/02 528/405 |
| 2018/0243938 | A1 | 8/2018 | Badoux et al. | |
| 2020/0157344 | A1 | 5/2020 | Kim et al. | |

FOREIGN PATENT DOCUMENTS

| | | | |
|---|---|---|---|
| EP | 3611225 | A2 | 2/2020 |
| WO | 2015/177114 | A1 | 11/2015 |
| WO | 2018/190662 | A2 | 10/2018 |
| WO | 2022/008671 | A1 | 1/2022 |

OTHER PUBLICATIONS

International Preliminary Report on Patentability received for PCT Patent Application No. PCT/EP2023/066455, mailed on May 3, 2024, 6 pages.
International Search Report and Written Opinion received for PCT Patent Application No. PCT/EP2023/066455, mailed on Sep. 8, 2023, 9 pages.

* cited by examiner

*Primary Examiner* — Camie S Thompson
(74) *Attorney, Agent, or Firm* — Faegre Drinker Biddle & Reath LLP

(57) ABSTRACT

The invention relates to a process for producing a lignocellulosic composite comprising one or more lignocellulosic composite layers. The process comprises S1) providing or preparing a mixture, at least comprising: lignocellulosic particles and a binder composition, the binder composition comprising as components at least: c1) one or more amino acid polymers having two or more primary amino groups and c2) one or more polyaldehyde compounds. The process further comprises S2) compacting the mixture from step S1) to receive a compacted mixture, and S3) applying heat and optionally pressure to the compacted mixture from step S2), so that the binder of the binder composition hardens and a lignocellulosic composite results. The invention further relates to the use of the lignocellulosic composite. Moreover, the invention relates to a kit for producing a binder composition, for use in the production of a lignocellulosic composite, and to the use of such binder composition.

20 Claims, No Drawings

BINDER FOR WOOD-BASED PANELS COMPRISING AMINO ACID POLYMER AND POLYALDEHYDE COMPOUND

CROSS-REFERENCE TO RELATED APPLICATIONS

This application is a National stage application (under 35 U.S.C. § 371) of PCT/EP2023/066455, filed Jun. 19, 2023, which claims benefit of European Application No. 22180562.5, filed Jun. 22, 2022, both of which are incorporated herein by reference in their entirety.

The present invention relates to a process for producing a lignocellulosic composite, a binder composition suitable for use in said process, as well as a lignocellulosic composite that can be produced by the process of the invention. The invention further relates to the use of the lignocellulosic composite. Moreover, the present invention relates to a kit for producing a binder composition according to the present invention, for use in the production of a lignocellulosic composite, and to the respective use of such binder composition.

Generally, in a process of producing a multilayer or single-layer lignocellulosic composite, a mixture of lignocellulosic particles (i.e. particles consisting essentially of lignocellulose) and a binder is provided or prepared. This mixture is typically scattered, e.g. to give a first layer of a multilayer mat or to give a single-layer mat. When producing a multilayer composite, successively two or more mixtures of lignocellulosic particles are scattered to give a mat with two or more individual layers. The resulting mat is then compacted, and the compacted mat or mixture is hardened during or after compaction, i.e. the mixture is treated in a manner so that the binder undergoes a hardening process.

There is a demand in industry for an improved process of producing a multilayer or single-layer lignocellulosic composite, wherein binder components can be used which can be obtained to the highest possible extent from non-petrochemical, preferably from renewable, resources, and which are suitable to reduce or avoid potentially hazardous substances like formaldehyde and isocyanates or substances which emit formaldehyde, during or after the production process of the composites, like e.g. N-methylol compounds.

The following literature deals with certain aspects of processes of producing multilayer or single-layer lignocellulosic composites:

Document US 2011/0262648 A1 describes durable thermosets from reducing sugars and primary polyamines.

Document WO 2015/177114 A1 pertains to a water-soluble carbohydrate-polyamino acid-based pre-reacted binder composition.

Document EP 3 611 225 A2 deals with a binder composition involving polylysine and at least one reducing sugar (where said at least one reducing sugar is not a polyaldehyde in the sense as defined herein), an article and a method for manufacturing an article.

Document WO 2022/008671 A1 describes a resin-impregnated fibrous material in the form of a sheet or a web, comprising an impregnating resin, which comprises a combination of a resin component A, which may be an aminoplast resin (i.e. a polycondensation product of one or more amino compounds—not including amino acids—and one or more aldehydes) and a resin component B, which is an oligomer or polymer having ethylenically unsaturated double bonds.

In the light of the existing prior art, there is still a need for an improved process of producing a multilayer or single-layer lignocellulosic composite, wherein binder components are used as much as possible which can be obtained from non-petrochemical resources, preferably from renewable resources, and wherein hazardous or potentially hazardous substances are reduced as much as possible or are avoided.

Correspondingly, it was a primary object of the present invention to provide an improved process of producing a multilayer or single-layer lignocellulosic composite, in particular a process wherein the resulting lignocellulosic composite has an increased strength, when compared to a similar lignocellulosic composite not produced according to the process of the present invention, or wherein shorter heating and/or press times are required for obtaining a lignocellulosic composite which has a strength comparable to a similar lignocellulosic composite not produced according to the process of the present invention.

It was a further object of the present invention to provide a binder composition suitable for use in an improved process of producing a multilayer or single-layer lignocellulosic composite, as well as a lignocellulosic composite resulting from said process.

A still further object of the present invention was to provide a process of producing a multi-layer or single-layer lignocellulosic composite and a respective binder composition wherein the binder composition would comprise a proportion of bio-based components, which should be as high as possible, in order to reduce or avoid the emission of hazardous or otherwise undesired volatile compounds during or after production, and to allow for safe disposal and/or a reduction of potentially environmentally harmful waste.

It has now been found that the primary object and other objects of the present invention can be accomplished by a process for producing a lignocellulosic composite comprising one (in particular a "single-layer lignocellulosic composite") or more lignocellulosic composite layers (in particular a "multilayer lignocellulosic composite"), comprising at least the following steps:

S1) providing or preparing a mixture, at least comprising:
  - lignocellulosic particles
  - and
  - a binder composition (preferably an aqueous binder composition, i.e. a binder composition comprising water), comprising as components, preferably for hardening the binder or binder composition, at least:
    - c1) one or more amino acid polymers having two or more primary amino groups, preferably comprising one or more polylysines, and
    - c2) one or more polyaldehyde compounds, preferably selected from the group consisting of compounds having two or more aldehyde groups and compounds having tautomers having two or more aldehyde groups;

S2) compacting the mixture from step S1) to receive a compacted mixture, and

S3) applying heat and optionally pressure (preferably applying heat and pressure) to the compacted mixture from step S2), so that the binder of the binder composition (preferably the curable components of the binder or binder composition) hardens and a lignocellulosic composite (or a layer of a multilayer lignocellulosic composite) results.

The invention as well as preferred variants and preferred combinations of parameters, properties and elements thereof are defined in the appended claims. Preferred aspects, details, modifications and advantages of the present invention are also defined and explained in the following description and in the examples shown below.

It has now been found (and it is shown in the examples below) that the process of producing a multilayer or single-layer lignocellulosic composite according to the present invention as described herein shows certain improvements over similar processes known from the prior art. In particular, said process according to the present invention results in a lignocellulosic composite with an increased strength (increased internal bond strength) when compared to a similar lignocellulosic composite not produced according to the process of the present invention, or wherein shorter heating and/or press times are required for obtaining a lignocellulosic composite with comparable strength as a similar lignocellulosic composite which was not produced according to the process of the present invention. In many cases, said process according to the present invention also results in a lignocellulosic composite, which shows lesser swelling upon contact with moisture, when compared to a similar lignocellulosic composite not produced according to the process of the present invention.

If not stated otherwise, preferred embodiments, aspects or features of the present invention can be combined with other embodiments, aspects or features, especially with other preferred embodiments, aspects or features, irrespective of the categories to which the embodiments, aspects or features relate. The combination of preferred embodiments, aspects or features with other preferred embodiments, aspects or features in each case again results in preferred embodiments, aspects or features.

As used herein, the term “lignocellulosic particles” designates and includes any type, size and shape of lignocellulosic particles, such as fibres, chips, strands, flakes, sawmill shavings and saw dust or mixtures thereof. In addition, any type of lignocellulosic biomass such as birch, beech, alder, pine, spruce, larch, eucalyptus, linden, poplar, ash, fir, tropical wood, sisal, jute, flax, coconut, kenaf, hemp, banana, straw, cotton stalks, bamboo and the like can be used as a source for said lignocellulosic particles. Lignocellulosic particles from both virgin wood and/or waste wood, such as old furniture, can be used to produce the lignocellulosic composite of the present invention. According to the present invention, it is further possible to use mixtures of different types of lignocellulosic particles in the production of a lignocellulosic composite.

As used herein, the term “single-layer lignocellulosic composite” (i.e. a lignocellulosic composite comprising one lignocellulosic composite layer) designates and includes any single-layered composite material, which contains lignocellulosic particles and a hardened binder that binds the lignocellulosic particles. Furthermore, the term “single-layer” specifies that the lignocellulosic composite comprises only one layer of lignocellulosic material and binder, wherein the single layer preferably is produced by a process comprising a single step of scattering lignocellulosic particles. The “single-layer lignocellulosic composite” can be of any shape such as rectangular, square, round, triangular and the like. The “single-layer lignocellulosic composite” can also be of any thickness, density and colour as long as it contains lignocellulosic particles and a hardened binder. The “single-layer lignocellulosic composite” can also comprise several other compounds different from lignocellulosic particles and binders. The lignocellulosic particles used in the production of a “single-layer lignocellulosic composite” are of the same type or of different types of lignocellulosic biomass (see above for preferred types).

As used herein, the term “multilayer lignocellulosic composite” (i.e. a lignocellulosic composite comprising more than one lignocellulosic composite layers) designates and includes any multi layered composite, which contains lignocellulosic particles and a hardened binder that binds the lignocellulosic particles, and wherein distinguishable (individual) layers are present within the composite. The multilayer lignocellulosic composite preferably comprises at least two distinguishable (individual) layers, in particular a core layer and an upper and a lower surface layer; or four or more layers within the same composite material. The adjacent layers of the multilayer lignocellulosic composite are distinguishable in terms of their composition, density, colour or any other properties and adjacent layers comprise identical types of lignocellulosic particles and/or binders or different types of lignocellulosic particles and/or binders. The (individual) layers may also comprise or consist of different materials than lignocellulosic particles and/or binders, such as plastics, fabrics, paint coat or the like, for examples derived from foreign matter in waste wood, however, at least one layer of the “multilayer lignocellulosic composite” must comprise lignocellulosic particles. The lignocellulosic particles used in the production of an individual layer of a “multi-layer lignocellulosic composite” are of the same type or of different types of lignocellulosic biomass (see above for preferred types). The lignocellulosic particles used in the production of separate (individual) layers of a “multilayer lignocellulosic composite” are of the same type or of different types of lignocellulosic biomass (see above for preferred types) or are identical or different mixtures of two or more of such types of lignocellulosic biomass. Furthermore, the term “multilayer” specifies that the lignocellulosic composite comprises at least two individual layers, wherein at least one, preferably two or more, of these individual layers comprise lignocellulosic material and binder, wherein one or more or all of said layers preferably are produced in a multi-step-process comprising for each (individual) layer of lignocellulosic material and binder a step of scattering lignocellulosic particles.

As used herein the term “amino acid polymer(s) having two or more primary amino groups” (of component c1) of the binder composition) designates a polymer compound which is a polymerization product of amino acids and optionally other monomers (wherein the monomers of the polymer compound are preferably connected with or bound to each other via amide bonds), wherein said other monomers are selected from the group consisting of a) amines comprising at least two amino groups, wherein the amines are not amino acids, and b) organic compounds having at least two carboxyl groups, preferably selected from the group consisting of organic dicarboxylic acids and organic tricarboxylic acids, wherein the organic compounds having at least two carboxyl groups are not amino acids, wherein preferably at least 50 wt.-%, preferably at least 75 wt.-%, preferably at least 85 wt.-%, preferably at least 90 wt.-%, preferably at least 95 wt.-%, preferably at least 97.5 wt.-%, preferably at least 99 wt.-%, preferably 100 wt.-%, amino acids are used as monomers for the polymerization reaction based on the total amount of monomers forming the amino acid polymer (s) having two or more primary amino groups.

Generally and for the purpose of the present invention, said amino acid polymer(s) having two or more primary amino groups may comprise or consist of dimers (n=2), trimers (n=3), oligomers (n=4-10) and/or macromolecules (n>10), wherein n is the number of monomers which have been reacted to form the dimers, trimers, oligomers and macromolecules of the amino acid polymer(s) having two or more primary amino groups.

The skilled person will select the monomers for producing said amino acid polymer(s) having two or more primary amino groups so as to receive desired amino acid polymer(s) having two or more primary amino groups.

As used herein, the term "amino acid polymer(s) having two or more primary amino groups" also includes derivatives, which are obtained by modification of the amino acid polymer(s) having two or more primary amino groups after polymer synthesis. Said modifications may be performed by reaction with the following reagents:

i) alkyl- or alkenylcarboxylic acids, such as for example octanoic acid, nonanoic acid, decanoic acid, dodecanoic acid, hexadecenoic acid, stearic acid, oleic acid, linoleic acid and/or linolenic acid and/or or their Li, Na, K, Cs, Ca or ammonium salts, and/or ii) polyalkylene oxides which are terminated by amino groups and/or acid groups and have a functionality of one, two or more, preferably polyethylene oxides, polypropylene oxides and/or polyethylene-propylene oxide, and/or iii) alkylene oxides, such as ethylene oxide, propylene oxide and/or butylene oxide and/or iv) lactones, e.g. epsilon-caprolactone, delta-valerolactone, gamma-butyrolactone and/or v) alcohols, such as alkanoles, for example oleyl alcohol.

Amino acid(s) which may be present as monomers in the amino acid polymer(s) having two or more primary amino groups are organic compounds comprising at least one primary amine (—$NH_2$) functional group and at least one carboxyl (—COOH) functional group. Said amino acid(s) are preferably selected from the group consisting of lysine, histidine, isoleucine, leucine, methionine, phenylalanine, threonine, tryptophan, valine, arginine, aspartic acid, glutamic acid, serine, asparagine, glutamine, cysteine, selenocysteine, glycine, alphaalanine, beta-alanine, tyrosine, gamma-aminobutyric acid, epsilon-aminocaproic acid, ornithine, diaminopimelic acid, 2,3-diaminopropionic acid, 2,4-diaminobutyric acid or mixtures thereof. The amino acids can be used in their L- or D- or racemic form. The amino acids may also be used in their cyclic lactam form, e.g. epsilon-caprolactam.

Preferred amino acids which are used for the polymerization reaction (as monomers for forming said amino acid polymer(s) having two or more primary amino groups, for use in the process according to the present invention) are diamino acids, comprising two amino groups, preferably two primary amino groups (—$NH_2$), and at least one carboxyl (—COOH) group. Such diamino acids are preferably selected from the group consisting of ornithine, diaminopimelic acid, 2,3-diaminopropionic acid, 2,4-diaminobutyric acid and lysine. Lysine is preferred as amino acid monomer for forming said amino acid polymer(s) having two or more primary amine groups. L-lysine is even more preferred for this purpose.

Preferred is also a process of the present invention as described herein (or a process of the present invention as described herein as being preferred), wherein the one or more amino acid polymers having two or more primary amino groups (of component c1)) comprise(s) or is (are) a polymer compound which is a polymerization product of amino acids, preferably of diamino acids, comprising two primary amino groups (—$NH_2$), and at least one carboxyl (—COOH) group, more preferably of amino acids selected from the group consisting of ornithine, diaminopimelic acid, 2,3-diaminopropionic acid, 2,4-diaminobutyric acid and lysine.

Said amino acid polymer(s) having two or more primary amine groups can be linear or branched or partially linear and partially branched.

Preferred amino acid polymer(s) having two or more primary amine groups for the purpose of the present invention are described below.

As used herein, the term "polyaldehyde compounds" (of component c2) of the binder composition) designates compounds having two or more (and preferably two) aldehyde groups, and compounds having tautomers having two or more (and preferably two) aldehyde groups (such as 5-(hydroxymethyl) furan-2-carbaldehyde), which compounds are capable of reacting with amine compounds, and optionally further compounds, in order to form a hardened binder. As used herein, the phrase "compounds having tautomers having two or more aldehyde groups" means compounds which can provide two or more aldehyde groups in a suitable reaction (e.g. in a reaction with one or more amino acid polymers having two or more primary amino groups), although said "compounds having tautomers having two or more aldehyde groups" may exist in tautomeric forms of their chemical structures which do not show (or which reveal) one or both aldehyde functions (this phenomenon also being known as "keto-enol-tautomerism"). An example of such tautomeric form of a compound having tautomers having two or more aldehyde groups where said tautomeric form does not show both available aldehyde functions of the chemical compound is 5-(hydroxymethyl) furan-2-carbaldehyde (HMF; CAS RN 67-47-0).

For use in the binder composition in component c2), such polyaldehyde compound(s) must be capable of reacting with the amino acid polymers having two or more primary amino groups used in component c1).

The binder composition as used in the process of the present invention comprises as components, preferably for hardening the binder or binder composition, components c1), one or more amino acid polymers having two or more primary amino groups, and c2), one or more polyaldehyde compounds. Components c1) and c2) are also referred to herein as "curable components", preferably as "heat-curable components" of the binder or binder composition. More specifically, components c1) and c2) are also referred to herein collectively as "binder", and separately as "curable components", preferably as "heat-curable components", of the binder.

Preferred is a process of the present invention as described herein (or a process of the present invention as described herein as being preferred), wherein the one or more amino acid polymers of component c1) of the binder composition comprise (or are) one or more polylysines, wherein preferably the one or more polylysines have a weight-average molecular weight $M_w$ of ≥800 g/mol, preferably of ≥1000 g/mol, more preferably of ≥1150 g/mol, even more preferably of ≥1500 g/mol, wherein preferably the weight-average molecular weight $M_w$ is determined by size exclusion chromatography;

and/or have a weight-average molecular weight $M_w$ of ≤10000 g/mol, preferably of ≤8000 g/mol, more preferably of ≤5000 g/mol and yet more preferably of ≤4000 g/mol, wherein preferably the weight-average molecular weight $M_w$ is determined by size exclusion chromatography;

and/or have a weight-average molecular weight $M_w$ in the range of 800 g/mol≤$M_w$≤10000 g/mol, preferably of 1000 g/mol≤$M_w$≤8000 g/mol, more preferably of 1500 g/mol≤$M_w$≤5000 g/mol and yet more preferably of 1800 g/mol≤$M_w$≤4000 g/mol, wherein preferably the weight-average molecular weight $M_w$ is determined by size exclusion chromatography;

and/or comprise as monomers integrated in their polymer structure at least 85 wt.-%, preferably at least 95 wt.-%, more preferably at least 99 wt.-%, and yet even more preferably 100 wt.-%, of lysine monomers, based on the total weight of monomers forming the polylysine.

Preferably, the wt.-% proportion (weight percentage) of lysine (monomers), preferably of L-lysine, in the one or more polylysines can be determined in a manner known per se, e.g. by complete hydrolysis of the polylysine and subsequent analysis of the resulting monomers by HPLC/MS. In this formal calculation regarding the amino acid (lysine) polymer of constituent c1), as preferably prepared by condensation of lysine, the release of water in the condensation from the amino acid is disregarded.

Weight-average molecular weights $M_w$ of the one or more amino acid polymers having two or more primary amino groups (as are used in the binder composition of the process according to the present invention), including of polylysines, are preferably determined by size exclusion chromatography (SEC), as is generally known in the field, and preferably under the conditions and applying the technical parameters as are specified herein in the examples section (cf. method No. 7 as described in the examples section).

Said one or more polylysines can be linear or branched or partially linear and partially branched.

As used herein, the term "polylysine(s)" designates a polymerization product of the monomer lysine, preferably of L-lysine, and optionally further monomers selected from the group consisting of a) amino acids, b) amines comprising at least two amino groups, wherein the amines are no amino acids, and c) dicarboxylic acids, which are no amino acids and tricarboxylic acids, which are no amino acids, wherein preferably the proportion of lysine in wt.-%, which is used as monomer for the polymerization reaction for producing the polylysine, based on the total amount of monomers used for the polymerization of the polylysine, is ≥10 wt.-%, preferably ≥20 wt.-%, or at least 50 wt.-%, preferably at least 75 wt.-%, preferably at least 85 wt.-%, preferably at least 95 wt.-%, more preferably at least 99 wt.-%, and yet even more preferably 100 wt.-%, of lysine, is used as the monomer for the polymerization reaction for producing said polylysine, based on the total amount of monomers used.

Preferred as polylysine(s) for the purpose of the present invention are homopolymers of lysine, preferably homopolymers of L-lysine.

Generally and for the purpose of the present invention, polylysine may comprise or consist of dimers (n=2), trimers (n=3), oligomers (n=4-10) and/or macromolecules (n>10), wherein n is the number of lysine monomers which have been reacted to form the dimers, trimers, oligomers and macromolecules of the polylysine(s). Additionally, lysine monomers may be present in a limited amount in a mixture with the polylysine, e.g. due to incomplete conversion of the monomers during the polymerization reaction for producing polylysine.

Lysine has two possibilities to react during polymerization. Either the α-$NH_2$ or the ε-$NH_2$ can react with the carboxylic acid. Therefore, two linear polylysine types exist, i.e. α-polylysine or the ε-polylysine. Polymerisation can also be performed in a manner, that both ε-$NH_2$ and the ε-$NH_2$ react with the carboxylic acid group to form both α-linkages and &linkages. Preferably, the polylysine is a branched polylysine. Preferred polylysine(s) as used according to the present invention have more ε-linkages than α-linkages. Preferably, the ratio of ε-linkages to α-linkages is between 1.0:1 and 6.0:1, preferably between 1.25:1 and 4.0:1, preferably between 1.5:1 and 3.0:1. This ratio can be determined by integration of the corresponding signals in the 1H-NMR spectra of the polylysines.

In the present text, the term polylysine preferably also includes polylysine derivatives, which are prepared by or can be prepared by a modifying reaction of (i) the amino groups present in the polylysine obtained by polymer synthesis with (ii) electrophiles like carboxylic acid, epoxides, and lactones, wherein the total amount of amino groups reacted in the modifying reaction is 20% or lower, preferably 10% or lower, based on the total amount of amino groups in the polylysine obtained in the polymer synthesis (i.e., before modification).

It has been found in own experiments that a process according to the present invention, wherein the binder composition comprises amino acid polymers having two or more primary amino groups, in particular polylysine(s), as component c1), is suitable for producing lignocellulosic composites which show an increased strength (or which require shorter press times for achieving a similar strength) when compared with similar lignocellulosic composites wherein other amino-functionalized compounds are used in the binder composition. For example, it is reported in WO 2015/177114 A1 that a binder composition comprising lysine monomer and hexamethylene diamine (HMDA) as amino-functionalized components could not be hardened satisfactorily in the presence of reducing sugars and sodium hydroxide.

Also preferred is a process of the present invention as described herein (or a process of the present invention as described herein as being preferred), wherein the one or at least one of the more or all of the more polyaldehyde compounds of component c2) of the binder composition are selected from the group consisting of oxidized starch, glyoxal, dialdehyde cellulose, propanedial, butanedial, pentanedial, hexanedial, furan-2,5-dicarbaldehyde, 5-(hydroxymethyl) furan-2-carbaldehyde (HMF; CAS RN 67-47-0), 3-hydroxy-2-oxo-propanal, and mixtures thereof.

As mentioned above, 5-(hydroxymethyl) furan-2-carbaldehyde (HMF) is for the present description considered a compound having two aldehyde groups, as it has an enol-keto-tautomer that has two aldehyde groups.

Preferably, the one or at least one of the more or all of the more polyaldehyde compounds of component c2) of the binder composition are selected (for the purpose of a process of the present invention as described herein or of a process of the present invention as described herein as being preferred), from the group consisting of glyoxal, furan-2,5-dicarbaldehyde, 5-(hydroxymethyl) furan-2-carbaldehyde, and mixtures thereof.

More preferably, the one or at least one of the more polyaldehyde compounds is 5-(hydroxymethyl) furan-2-carbaldehyde.

Furthermore, it is preferred a process of the present invention as described herein (or a process of the present invention as described herein as being preferred), wherein the mixture provided or prepared in step S1) further comprises c3) one or more alpha-hydroxy carbonyl compounds, preferably selected from the group consisting of glycolaldehyde, glyceraldehyde, 1,3-dihydroxyacetone, hydroxyacetone, arabinose, xylose, glucose, mannose, fructose, saccharose, and mixtures thereof.

It has been found in own experiments that a process according to the present invention, wherein the binder composition used in step S1) comprises as component c2) one or more polyaldehyde compounds (selected from the group consisting of compounds having two or more aldehyde groups and compounds having tautomers having two or more aldehyde groups), in particular the preferred one or more polyaldehyde compounds as specified above, is suitable for producing lignocellulosic composites which show an increased strength (or which require shorter press times for achieving a similar strength) and/or which show lesser swelling upon contact with moisture, when compared with similar lignocellulosic composites from the prior art (cf. e.g. EP 3 611 225 A2) wherein reducing sugars are used in the binder composition, but no polyaldehyde compound.

Also preferred is a process of the present invention as described herein (or a process of the present invention as described herein as being preferred), wherein the ratio of (i) the total weight of the one or more amino acid polymers of component c1) of the binder composition: (ii) the total weight of the one or more polyaldehyde compounds of component c2) of the binder composition is in the range of 60:40 to 95:5, preferably of 65:35 to 90:10 and more preferably of 70:30 to 90:10.

Also preferred is a process of the present invention as described herein (or a process of the present invention as described herein as being preferred), wherein the molar ratio of (i) the primary amino groups provided by the one or more amino acid polymers of component c1) of the binder composition: (ii) the aldehyde groups provided by the one or more polyaldehyde compounds of component c2) of the binder composition is in the range of 0.1 to 1.2, preferably of 0.2 to 1.0 and more preferably of 0.3 to 0.8. Again, 5-(hydroxymethyl) furan-2-carbaldehyde (HMF) is for the present description considered a compound having two aldehyde groups.

It has been found in own experiments that particularly high internal bond strengths could be achieved in lignocellulosic composites produced by the process according to the present invention when 5-(hydroxymethyl) furan-2-carbaldehyde was used as polyaldehyde (namely tautomeric dialdehyde) compound of component c2), or that shorter press times were required for achieving a defined internal bond strength, when compared with the use of a similar binder wherein another carbonyl compound than a polyaldehyde is used. Particularly good results (in terms of internal bond strength and/or reduced press times) are achieved in the process according to the present invention when polylysine (s) is/are used as component c1) of the binder composition and 5-(hydroxymethyl) furan-2-carbaldehyde is used as component c2) of the binder composition.

Similarly, it has been found in own experiments that best practical results for lignocellulosic composites produced by the process according to the present invention were achieved when the ratio of (i) the total weight of the one or more amino acid polymers of component c1) of the binder composition: (ii) the total weight of the one or more polyaldehyde compounds of component c2) of the binder composition was selected in the preferred ranges outlined above.

It has been found in own experiments that best practical results for lignocellulosic composites produced by the process according to the present invention were achieved when the binder composition had the above-defined proportions of components c1) and/or c2).

In addition it is preferred a process of the present invention as described herein (or a process of the present invention as described herein as being preferred), wherein the mixture provided or prepared in step S1) of the process (and preferably the binder composition) further comprises a carrier liquid, preferably water, wherein preferably component c1), the one or more amino acid polymers, is present in the binder composition in a total amount in the range of from ≥20 to ≤50 wt.-%, preferably of from ≥25 to ≤45 wt.-% and more preferably of from ≥25 to ≤40 wt.-%, relative to the totalized weight of components c1) to c2) and carrier liquid;

and/or component c2), the one or more polyaldehyde compounds, is present in the binder composition in a total amount in the range of from ≥3 to ≤20 wt.-%, preferably of from ≥5 to ≤15 wt.-% and more preferably of from ≥7 to ≤12 wt.-%, relative to the total weight of components c1) to c2) and carrier liquid;

and/or the pH-value of the binder composition is in the range of from 10 to 14, preferably of from 11 to 14, more preferably of from 12 to 14.

With respect to the amounts of components c1) and c2), as well as c3), it is not mandatory in accordance with the present invention that these are present within an ideally-mixed binder composition. Instead, the individual components may be applied to the lignocellulosic particles separately, and the amounts of components are given with respect to the total amounts of the individual components, as present within, or prepared to give, the final binder composition.

Also preferred is a process according to the invention as described herein (or a process of the present invention as described herein as being preferred), wherein in the mixture provided or prepared in step S1) of the process, the total amount of component c1), the one or more amino acid polymers of the binder composition, and of component c2), the one or more polyaldehyde compounds of the binder composition, is present in (or used for the preparation of the binder composition) in the range of from ≥3 to ≤8 wt.-%, preferably of from ≥3.5 to ≤7.5 wt.-%, and more preferably of from ≥4 to ≤ 6.5 wt.-%, relative to the total amount of the lignocellulosic particles in an oven-dry state of the mixture.

It was surprising that, with a relatively low total amount of components c1) and c2) as specified above, lignocellulosic composites can be obtained which are stable and robust enough for the use as lignocellulosic composite boards in many applications, e.g. in the furniture industry.

Generally, in step S1) for preparing said mixture, said lignocellulosic particles may be blended with one or more or all components of the binder composition and/or one or more or all components of the binder composition may be sprayed onto said lignocellulosic particles, while before blending or spraying said components of the binder composition are pre-mixed or not pre-mixed (preferably, they are pre-mixed).

A process of the present invention as described herein (or a process of the present invention as described herein as being preferred), is preferred wherein the mixture in step S1) is prepared by providing or preparing in a first step S1-1) the binder composition comprising at least components c1) and c2) and preferably water, and in a second step S1-2), contacting, the binder composition provided or prepared in step S1-1) with the lignocellulosic particles, preferably spraying said binder composition onto the lignocellulosic particles.

In the process of the present invention, the binder composition may additionally comprise one, two or more compounds independently selected from the group consisting of alkali salts and alkaline earth salts (preferably sodium nitrate), hydrophobizing agents (preferably paraffin and mixtures comprising paraffin, more preferably paraffin emulsions), dyes, pigments, antifungal agents, antibacterial agents, rheology modifiers, fillers, release agents, surfactants and tensides.

Preferred is a process of the present invention (preferably as defined herein above as being preferred), wherein the process of producing a lignocellulosic composite comprises steps that are carried out batchwise and/or steps that are carried out continuously. Thus, the process of the present invention is suitable for a large variety of different production facilities and offers numerous options for the production of the desired lignocellulosic composite, i.e. multilayer lignocellulosic composite comprising one or more, preferably two or more, more preferably three lignocellulosic composite layers or a single-layer lignocellulosic composite. As a preferred process of the present invention a batchwise production is chosen to produce individual lignocellulosic composites, e.g. having different shapes, thicknesses and the like, while a completely continuous process is preferably chosen for the production of more uniform lignocellulosic composites, e.g. having similar shapes, thicknesses and the like.

A preferred process of the present invention can also, and preferably, comprise one or more steps that are carried out batchwise, and one or more steps that are carried out continuously. One preferred example of such a combined process is the production of a single-layer lignocellulosic composite in continuously conducted process steps, and the subsequent batchwise (and preferably individual) production of a multilayer lignocellulosic composite using said continuously produced single-layer lignocellulosic composite as a starting material, e.g. as a core layer of said multilayer lignocellulosic composite.

A process of the present invention as described herein (or a process of the present invention as described herein as being preferred) is also preferred, wherein the lignocellulosic composite is a lignocellulosic board selected from the group consisting of:

- high-density fiberboard (HDF);
- medium-density fiberboard (MDF);
- low-density fiberboard (LDF);
- wood fiber insulation board;
- oriented strand board (OSB);
- chipboard; and
- natural fiber board, preferably with fibers from the group consisting of sisal, jute, flax, coconut, kenaf, hemp, banana, and mixtures thereof;

wherein the lignocellulosic board is a

- single-layer lignocellulosic board or
- multilayer lignocellulosic board,
- preferably a multilayer lignocellulosic board having a core layer and having an upper surface layer and a lower surface layer.

Furthermore preferred according to the present invention are multilayer boards with different composition within the individual layers, and also multilayer boards with different binder compositions within the individual layers. A preferred variant is a three-layer board with urea formaldehyde and/or isocyanate in the core layer and the binder composition of the present invention in the surface layers.

According to a preferred aspect of the process according to the present invention, the production process results in a lignocellulosic composite, that is preferably a single-layer lignocellulosic board or a multilayer lignocellulosic board, more preferably is a multilayer lignocellulosic board. The multilayer lignocellulosic board is more preferably a board having at least a core layer as well as an upper surface layer and a lower surface layer. The total number of layers is then three or more. If the number of layers is four or more, there are one or more intermediate layers. Preferred is a three-layer board having one core layer, an upper surface layer and a lower surface layer.

Consequently, a preferred aspect of the present invention relates to a process for the production of a high-density fiberboard (HDF), a medium-density fiberboard (MDF), a low-density fiberboard (LDF), a wood fiber insulation board, an oriented strand board (OSB), a chipboard or a natural fiber board, wherein the board preferably is either a single-layer lignocellulosic board or a multilayer lignocellulosic board, more preferably a multi-layer lignocellulosic board, most preferably a three-layer lignocellulosic board.

Compaction in step S2) generally takes place at a pressure of 0.1 to 3.0 MPa, preferably from 0.2 to 2.5 MPa, more preferably from 0.3 to 2.0 MPa. Usually, in step S2) the mixture from step S1) is compacted without applying heat to the mixture. Optionally, during or after step S2) and prior to process step S3) energy can be introduced into the compacted mixture by a preheating step with one or more energy sources of any kind. Suitable energy sources are for example hot air, electrical energy (e.g. microwave or high frequency heating), steam or steam/air mixtures. This increases the temperature of the compacted mixture and may change its moisture. After the optional preheating step, the temperature in the core of the compacted mixture may be between 40 to 80° C., preferably between 4° and 70° C. The preheating with steam and steam/air mixtures can also be conducted in such a way that only the surface-near areas are heated, but the core is not.

Compacting in step S2) and optionally preheating during or after step S2) can be carried out by a method known to the person skilled in the art, such as those described in M. Dunky, P. Niemz, Holzwerkstoffe and Leime [Wood Materials and Glues], Springer Verlag Heidelberg, 2002, pg. 122 and 819 or in H.-J. Deppe, K. Ernst, MDF-Medium Density Fiberboard, DRW-Verlag, 1996, pp. 44, 45 and 93 or in A. Wagenfuhr, F. Scholz, Taschenbuch der Holztechnik [Handbook of Wood Technology], Fachbuchverlag Leipzig, 2012, pg. 219.

In step S3) of the process of the present invention, heat and/or (preferably "and") pressure are applied to the compacted mixture from step S2) so that the binder of the binder composition hardens.

Heat is applied in such way, that during step S3) or at the end of step S3) the temperature in the center of formed lignocellulosic composite may be at least 80° C., preferably between 8° and 180° C., preferably between 9° and 150° C., more preferably 95 to 125° C.

Preferably, the temperature applied in step S3) is measured in the center of the (three-dimensional) lignocellulosic composite resulting at the end of step S3).

In step S3) the compacted mixture (compacted mat) obtained after step S2) may be further compacted. Preferably, the pressure in step S3) is in the range of from 0.1 to 10 MPa, preferably of from 0.5 to 8 MPa and more preferably of from 1 to 6 MPa.

The measurement of the temperature in the center of the lignocellulosic composite can be carried out according to known methods, in particular according to the method described by Meyer/Thoemen, Holz als Roh-und Werkstoff [European Journal of Wood and Wood Products] (2007) 65, p. 49-55, or Thoemen, 2010, "Vom Holz zum Werkstoff—grundlegende Untersuchungen zur Herstellung und Struktur von Holzwerkstoffen [From wood to materials-basic investigations for the preparation and the structure of wood-based materials]", ISBN 978-3-9523198 Sep. 5, page 24 to 30 and page 78 to 85. For the wireless measurement of the temperature sensors such as the CONTI LOG—or EASYlog-sensors of the Fagus-Grecon Greten GmbH& Co. KG can be used, which can be inserted in the mixture for producing the lignocellulosic composite, e.g. during or after step S1). When a high-frequency is applied during step S3) the temperature in the center of the lignocellulosic composite can be measured with a temperature sensor consisting of a Teflon-coated glass fiber with a gallium arsenide chip.

The application of heat in step S3) can be carried out by heat transfer from heated surfaces, in particular from the hot surfaces of press plates (in single-opening or multi-daylight presses) or belts (in double belt presses), and/or by high-frequency heating (applying a high-frequency electrical field). For example, step S3) may be conducted in a conventional hot press like the double belt press CPS+ from Dieffenbacher GmbH Maschinen-und Anlagenbau or ContiRoll® from Siempelkamp GmbH & Co. KG. After step S3), the lignocellulosic composite ("board") can be cooled down in a star cooler or more slowly by hot stacking.

When the application of heat in step S3) is carried out by heat transfer from hot surfaces, e.g. in conventional hot presses, the temperature of these surfaces is in the range of from 80 to 300° C., more preferably of from 120 to 280° C. and even more preferably of from 150 to 250° C.

In a preferred embodiment of the process of the present invention (or of a process of the present invention as described herein as being preferred), the heating in step S3) comprises applying a high-frequency electrical field, preferably to the mixture, preferably so that the binder hardens and binds the lignocellulosic particles, so that a lignocellulosic composite (or a layer of a multilayer lignocellulosic composite) results.

The term "high-frequency electrical field" as used herein designates and includes any kind of high-frequency electrical or electromagnetic field, such as microwave irradiation or a high-frequency electrical field, that results after applying a high-frequency alternating voltage at a plate capacitor between two capacitor plates. Suitable frequencies for the high-frequency electrical field are in the range of from 100 kHz to 30 GHZ, preferably 6 MHz to 3 GHZ, more preferably 13 MHz to 41 MHZ. Especially suitable and preferred are the respective nationally and internationally approved frequencies such as 13.56 MHZ, 27.12 MHz, 40.68 MHZ, 2.45 GHZ, 5.80 GHZ, 24, 12 GHZ, more preferably 13.56 und 27.12 MHZ. The electrical power used to create such a high-frequency electrical field in the processes of the present invention preferably is in the range of from 10 to 10000 kWh, more preferably of from 100 to 5000 kWh, most preferably of from 500 to 2000 kWh.

Preferred is a process of the present invention as described herein (or a process of the present invention as described herein as being preferred), wherein the process of producing a lignocellulosic composite comprises one, two, three, more than three, or all of the following steps

- preparing, preferably preparing by scattering, a layer of the mixture provided or prepared in step S1), and in step S2) compacting this layer,
- for preparing a multilayer lignocellulosic composite comprising one or more lignocellulosic composite layers, providing or preparing at least a first and a second individual mixture, and using said first and second individual mixtures for making a first and a second layer of the multilayer lignocellulosic composite, wherein the first and the second layer preferably are in contact with each other, and/or wherein the first and the second individual mixture have the same composition or have different compositions,
- for preparing a multilayer lignocellulosic composite, preparing two or more layers, preferably preparing two or more layers by scattering individual layers on top of each other, each layer comprising lignocellulosic particles and a binder, wherein in the two or more layers the lignocellulosic particles and/or the binders are the same or different,
- during or after compacting in step S2), pre-heating the mixture,
- heating in step S3) in such way, that during step S3) or at the end of step S3) the temperature in the center of formed lignocellulosic composite may be at least 80° C., preferably between 8° and 180° C., preferably between 9° and 150° C., more preferably 95 to 125° C. and
- applying a pressure in the range of from of 1 to 10 MPa in step S3) to the compacted mixture from step S2).

According to the invention, any application of pressure (compacting) may be effected in several stages.

According to preferred aspects of the process of the present invention, the process of the present invention for producing a lignocellulosic composite comprises one, two, three or more preferred steps, which are either specific embodiments of steps S1), S2), or S3), respectively, or are additional steps. Each of these preferred steps is optional and can be conducted individually or in combination with one or more of the other preferred steps.

One of the preferred steps relates to step S1) of preparing said mixture comprising or consisting of said lignocellulosic particles and said binder composition. According to this preferred aspect, the lignocellulosic particles are blended with one or more or all components of the binder composition or one or more or all components of the binder composition are sprayed onto said lignocellulosic particles. Specifically, components of the binder composition are blended with or sprayed onto the lignocellulosic particles simultaneously (e.g. in a mixture with each other) or successively, preferably successively, as is further specified and outlined above.

Another preferred step of the present invention is the step of preparing, preferably preparing by scattering, a layer of the mixture provided or prepared in step S1), and in step S2) compacting this layer. The preparation of a layer by scattering is a preferred additional step for the production of a lignocellulosic composite.

According to a preferred aspect of the present invention, for preparing a multilayer lignocellulosic composite, at least a first and a second individual mixture are provided or prepared. Said first and second individual mixtures are then used for making a first and a second layer of the multilayer lignocellulosic composite. Preferably, the first and the second layer are in contact with each other. According to this preferred aspect, the first and the second individual mixture have the same or a different composition, even more preferably the first and the second individual mixture have a different composition. Thus, the different individual mixtures and/or layers of the prepared multilayer lignocellulosic composite preferably differ in specific properties such as density, color, and the like and/or they differ in terms of their composition, wherein differing compositions are obtained by using different binders, lignocellulosic particles and/or other (additional) components such as plastics, fabrics, paint coat or the like, for example derived from foreign matter in waste wood. Individual layers preferably (i) comprise different binders and different lignocellulosic particles or (ii) comprise identical binders, but different lignocellulosic particles or (iii) comprise identical binders and identical lignocellulosic particles, but in different ratios.

According to a technically related preferred process of the present invention the preparation of a multilayer lignocellulosic composite comprises the preparation of two, three or more layers, each layer comprising lignocellulosic particles and a binder. Preferably the lignocellulosic particles and/or the binders in said two, three or more layers are the same or different, even more preferably the lignocellulosic particles are different and the binders are different.

In a preferred process of the present invention the preparation of a single-layer lignocellulosic composite or a multilayer lignocellulosic composite comprises the following steps:

providing or preparing one, two or more than two mixtures at least comprising lignocellulosic particles and a binder according to the invention, scattering this mixture/these mixtures to give one, two or more than two layers, wherein the layer(s) form a mat, in a first compacting step during step S2) pre-compacting this single-layer or multilayer mat to give a pre-compacted mat, and thereafter in a second compacting step during step S3) compacting the pre-compacted mat while applying heat and pressure.

The present invention also relates to a binder composition for producing a lignocellulosic composite, preferably as used in and defined above with respect to the process according to the present invention for producing a lignocellulosic composite as described herein, or with respect to a process of the present invention as described herein as being preferred (or to a respective binder composition of the present invention as described herein as being preferred).

Generally, all aspects of the present invention discussed herein in the context of the process according to the present invention for producing a lignocellulosic composite apply mutatis mutandis to the binder composition of the present invention, and its use, and vice versa.

Accordingly, the invention further relates to a binder composition or mixture for producing a lignocellulosic composite, comprising as components at least:

c1) one or more amino acid polymers having two or more primary amino groups, preferably comprising one or more polylysines (preferably as defined herein or as defined herein as preferred) and c2) one or more polyaldehyde compounds, selected from the group consisting of compounds having two or more aldehyde groups and compounds having tautomers having two or more aldehyde groups (preferably as defined herein or as defined herein as preferred).

Generally, all aspects of the present invention discussed herein in the context of the process according to the present invention for producing a lignocellulosic composite and/or in the context of the binder composition of the present invention apply mutatis mutandis to the use of the binder composition of the present invention, and vice versa.

The present invention further relates to a lignocellulosic composite, obtainable or obtained according to a process according to the present invention as described herein (or according to a process of the present invention as described herein as being preferred), and (or to a construction product comprising such lignocellulosic composite, wherein preferably the lignocellulosic composite is a lignocellulosic board selected from the group consisting of:

high-density fiberboard (HDF),
medium-density fiberboard (MDF),
low-density fiberboard (LDF),
wood fiber insulation board,
oriented strand board (OSB),
chipboard, and
natural fiber board, preferably with fibers from the group consisting of sisal, jute, flax, coconut, kenaf, hemp, banana, and mixtures thereof, wherein preferably the lignocellulosic board is a single-layer lignocellulosic board or
multilayer lignocellulosic board,
preferably a multilayer lignocellulosic board having a core and having an upper surface layer and a lower surface layer.

Generally, all aspects of the present invention discussed herein in the context of the process according to the present invention for producing a lignocellulosic composite and/or of the binder composition of the present invention and/or of the use of the binder composition of the present invention apply mutatis mutandis to the lignocellulosic composite of the present invention, and vice versa.

The term "construction product" as used herein designates products used for constructions such as decking, doors, windows, floors, panels, furniture or parts of furniture. The construction product of the present invention is preferably selected from the group consisting of furniture and parts of furniture.

The term "furniture" as used herein designates all kinds of furniture. In the context of the present invention, furniture is preferably selected from the group consisting of chairs, tables, desks, closets, beds and shelves.

The term "building element" as used herein designates lignocellulosic composite products (e.g., boards, see above) which constitute a part (element) of a construction product (e.g., a part of furniture). Such building elements preferably are parts of furniture, and more preferably such parts of furniture are selected from the group consisting of shelves, table plates, side boards or shelves or doors of cabinets, and side walls of beds.

The lignocellulosic composite, specifically board, of the present invention, in particular if it is an element of a construction product of the present invention, preferably comprises lignocellulosic particles selected from the group consisting of fibres, chips, strands, flakes, sawmill shavings and saw dust or mixtures thereof. These lignocellulosic particles are preferably derived from any type of lignocellulosic biomass such as birch, beech, alder, pine, spruce, larch, eucalyptus, linden, poplar, ash, fir, tropical wood, sisal, jute, flax, coconut, kenaf, hemp, banana, straw, cotton stalks, bamboo and the like or mixtures thereof.

A lignocellulosic composite, preferably board, of the present invention, obtainable or obtained according to a process of the present invention, preferably is a single-layer lignocellulosic board or a multilayer lignocellulosic board, more preferably is a single-layer lignocellulosic board. A multilayer lignocellulosic board of the present invention is a board comprising at least two distinguishable (individual) layers. The multilayer lignocellulosic board is preferably a board having at least a core layer as well as an upper surface layer and a lower surface layer. The total number of layers is then three or more. If the number of layers is four or more, there are one or more intermediate layers. Preferred is a three-layer board having one core layer, an upper surface layer and a lower surface layer. This is specifically relevant if the lignocellulosic composite, preferably board, of the present invention is an element of a construction product of the present invention.

Particularly preferred are a single-layer lignocellulosic board of the present invention that is a medium-density fiberboard (MDF) or a chipboard, even more preferably is a medium-density fiberboard (MDF), and a corresponding construction product comprising such single-layer lignocellulosic board.

The present invention also pertains to the use of a lignocellulosic composite according to the present invention as described herein (or to a respective lignocellulosic composite as described herein as being preferred) as building element in a construction product, preferably selected from products used for constructions selected from the group consisting of decking, doors, windows, floors, panels, furniture and parts of furniture.

Generally, all aspects of the present invention discussed herein in the context of the process according to the present invention for producing a lignocellulosic composite and/or of the binder composition of the present invention and/or of the use of the binder composition of the present invention and/or of the lignocellulosic composite of the present invention apply mutatis mutandis to the use of the lignocellulosic composite of the present invention, and vice versa.

The present invention then also relates to a kit for producing a binder composition for use in the production of a lignocellulosic composite, comprising as spatially separated, individual components at least:

k1) one or more amino acid polymers having two or more primary amino groups, preferably comprising one or more polylysines, (preferably as defined herein or as defined herein as preferred) and k2) one or more polyaldehyde compounds, preferably selected from the group consisting of compounds having two or more aldehyde groups and compounds having tautomers having two or more aldehyde groups (preferably as defined herein or as defined herein as preferred).

The present invention then further relates to the use of the binder composition according to the present invention (or to the use of a respective binder composition according to the present invention as described herein as being preferred), in a process for producing a lignocellulosic composite. Hence, the invention relates to the use of a binder composition comprising as components at least:

c1) one or more amino acid polymers having two or more primary amino groups, preferably comprising one or more polylysines, (preferably as defined herein or as defined herein as preferred) and c2) one or more polyaldehyde compounds, preferably selected from the group consisting of compounds having two or more aldehyde groups and compounds having tautomers having two or more aldehyde groups (preferably as defined herein or as defined herein as preferred);

in a process for producing a lignocellulosic composite, preferably in a process for producing a lignocellulosic composite according to the present invention as described herein (or in a process of the present invention as described herein as being preferred).

Generally, all aspects of the present invention discussed herein in the context of the process according to the present invention for producing a lignocellulosic composite and/or of the binder composition of the present invention and/or of the use of the binder composition of the present invention and/or of the lignocellulosic composite of the present invention and/or to the use of the lignocellulosic composite of the present invention apply mutatis mutandis to the kit of the present invention, and vice versa.

EXAMPLES

The following examples are meant to further explain and illustrate the present invention without limiting its scope.

A. Materials Used

Glucose monohydrate (>99%), Sigma Aldrich, Spain
Fructose (>99%), Sigma Aldrich, US
Hexamethylene diamine (HMDA, >99%), Acros Organic
L-Lysine (98%), Sigma Aldrich, Switzerland
L-Lysine solution (50% in water), ADM animal nutrition, US
Carboxymethylcellulose sodium salt ($M_w$ ca 250.000), Sigma-Aldrich, US
5-Hydroxymethyl furfural (HMF), aber GmbH, US
Spruce wood chips (from Germany, Institut für Holztechnologie Dresden, Germany):

The spruce wood chips ("chips") were produced in a disc chipper. Spruce trunk sections (length 250 mm) from Germany were pressed with the long side against a rotating steel disc, into which radially and evenly distributed knife boxes are inserted, each of which consists of a radially arranged cutting knife and several scoring knives positioned at right angles to it. The cutting knife separates the chip from the round wood and the scoring knives simultaneously limit the chip length. Afterwards the produced chips are collected in a bunker and from there they are transported to a cross beater mill (with sieve insert) for re-shredding with regard to chip width. Afterwards the reshredded chips were conveyed to a flash drier and dried at approx. 120° C. The chips were then screened into two useful fractions (B: ≤2.0 mm×2.0 mm and >0.32 mm×0.5 mm; C: ≤4.0 mm×4.0 mm and >2.0 mm×2.0 mm), a coarse fraction (D: >4.0 mm×4.0 mm), which is re-shreded, and a fine fraction (A: ≤0.32 mm×0.5 mm). A mixture of 60 wt.-% of fraction B and 40 wt.-% of fraction C is used as chips for single-layered chipboards ("core layer chips")

B. Measured Values and Measuring Methods

1. Press Time Factor:

The press time factor is the press time, which is the time from closing to opening of the press, divided by the target thickness of the board. The target thickness refers to the board at the end of pressing step (process step S3) and is adjusted by the press conditions, i.e. by the distance between the top and bottom press plate, which is adjusted by inserting two steel spacing strips in the press (if the hot press was used), or by the automatic distance control (if the HF press was used). Press time factor [sec/mm]=time from closing to opening of the press [sec]: target thickness of the pressed board [mm]. For example, when a 10 mm chipboard is made with a press time of 140 sec, a press time factor of 14 sec/mm results.

2. Density of the Boards:

The density of the boards was measured according to EN 323:1993 and is reported as the arithmetic average of ten 50×50 mm samples of the same board.

3. Transverse Tensile Strength of the Boards ("Internal Bond")

Transverse tensile strength of the boards ("internal bond") was determined according to EN 319:1993 and is reported as the arithmetic average of ten 50×50 mm samples of the same board.

4. Swelling in Thickness:

Swelling in thickness after 24 h of the boards ("24 h swelling") was determined according to EN 317:1993 and is reported as the arithmetic average of ten 50×50 mm samples of the same board.

5. Binder Amount:

The binder amounts in the examples according to the present invention are reported as the total weight of the sum of the respective binder components amino acid polymer and polyaldehyde in wt.-%, based on the total dry weight of the wood particles (chips).

The binder amounts in the comparative examples are reported as the total weight of the sum of all binder components in wt.-% (dry weight, which is the weight of the components without any water), based on the total dry weight of the wood particles (chips).

6. Primary and Secondary Amino Group Nitrogen Content $NC_{ps}$:

The primary and secondary amino group nitrogen contents are measured by potentiometric titration according to EN ISO 9702:1998. The $NC_{ps}$ means the weight of nitrogen of the primary and secondary amino groups per 100 g of amino acid polymer (given in wt.-%).

7. Determination of the Weight-Average Molecular Weight $M_w$ $M_w$ was determined by size exclusion chromatography under the following conditions:

- Solvent and eluent: 0.1% (w/w) trifluoroacetate, 0.1 M NaCl in distilled water
- Flow: 0.8 ml/min
- Injection volume: 100 μl
- Samples were filtrated with a Sartorius Minisart RC 25 (0.2 μm) filter
- Column material: hydroxylated polymethacrylate (TSK-gel G3000PWXL)
- Column size: inside diameter 7.8 mm, length 30 cm
- Column temperature: 35° C.
- Detector: DRI Agilent 1100 UV GAT-LCD 503 [232 nm]
- Calibration with poly(2-vinylpyridine) standards in the molar mass range from 620 to 2890000 g/mole (from Polymer Standard Service GmbH, Mainz, Germany) and pyridine (79 g/mol).
- The upper integration limit was set to 29.01 mL.
- The calculation of $M_w$ includes the lysine oligomers and polymers as well as the monomer lysine.

The residual lysine monomer content of the polylysine solution was determined by HPLC/MS analysis, under the following conditions:

- Injection volume: 10 μl
- Eluent A: water+0.02% formic acid
- Eluent B: water
- Gradient

| time [min] | Eluent A [%] | Eluent B [%] |
|---|---|---|
| 0 | 0 | 100 |
| 10 | 100 | 0 |
| 15 | 100 | 0 |
| 15.1 | 0 | 100 |
| 25 | 0 | 100 |

- Switching from Eluent A to Eluent B after 15 min
- Flow: 0.8 ml/min
- Column HPLC: Primesep C, 250×3.2 mm, 5 μm
- Column temperature: 30° C.
- Calibration with solution of L-lysine in water
- Mass spectrometer: Bruker Maxis (q-TOF)
- MS conditions:
  - Ionization mode: ESI, negative
  - Capillary: 3500 V
  - Nebulizer: 1.4 bar
  - Dry gas: 8 l/min
  - Temperature: 200° C.
  - analyzed ion: 145.0983 $[M-H]^-$±0.005 amu.

The residual lysine monomer content in polylysine is given as wt.-% monomer based on the total weight of polylysine including the lysine monomer. For instance, the 50 wt.-% solution of Polylysine-5 (see table 1 below) with a lysine monomer content of 2.0 wt.-% contains 1 wt. % lysine monomer and 49% wt.-% lysine polymer comprising at least 2 condensed lysine units.

8. Determination of Ratio of ε-Linkages to α-Linkages in Polylysine ("Ratio ε/α");

This ratio ε/α is determined by integration of the signals for —CH—$NH_2$ and —CH—NH (α-linked) and —$CH_2$—$NH_2$ and —$CH_2$—NH (&-linked) in the 1H-NMR spectra of the respective polylysines. The NMR signals are assigned by an 1H, 15N-HMBC (Heteronuclear Multiple Bond Correlation) experiment.

C. Preparation Examples

Preparation of Samples of Different Polylysines:

2200 g of L-lysine solution (50% in water, ADM) was heated under stirring in an oil bath (external temperature 140° C.). Water was distilled off and the oil bath temperature was increased by 10° C. per hour until a temperature of 180° C. had been reached. The reaction mixture was stirred for an additional hour at 180° C. (oil bath temperature) and the pressure was then slowly reduced to 200 mbar. After reaching the target pressure, distillation was continued for another period of time t (as specified in Table 1 below). The hot product was poured out of the reaction vessel, crushed after cooling, and dissolved in water, to give a 50 wt.-% solution. Polylysine samples "Polylysine 1" to "Polylysine 6" were produced according to this procedure. The reaction conditions applied in each case and certain parameters measured of said different polylysines are shown in Table 1 below.

In these examples, the lysine monomer contributed a certain amount of amino groups to the binder.

Residual lysine monomer content, $NC_{ps}$ and $M_w$ were each determined from this solution without any further purification. The residual lysine monomer is included in the calculation of $M_w$.

TABLE 1

Reaction conditions in the synthesis and properties of different samples of polylysines

| Polylysine type | t [min] | $M_w$ [g/mol] | $NC_{ps}$ [wt.-%] | L-Lysine monomer content [wt.-%]* | ratio ε/α |
|---|---|---|---|---|---|
| Polylysine-1 | 90 | 1510 | 11.0 | 10.3 | 1.9 |
| Polylysine-2 | 120 | 2010 | 10.5 | 5.9 | 2.1 |
| Polylysine-3 | 150 | 2240 | 10.2 | 4.2 | 2.2 |
| Polylysine-4 | 180 | 2740 | 9.80 | 2.5 | 2.3 |
| Polylysine-5 | 210 | 3360 | 9.50 | 2.0 | 2.3 |
| Polylysine-6 | 240 | 3690 | 9.15 | 1.3 | 2.2 |

*The residual lysine monomer content is given as wt.-% based on the total weight of polylysine including lysine monomer.

Comparative Binder Composition-1

161 g of glucose monohydrate, 146 g of fructose and 161 g of L-lysine were mixed with 35 g of water and slowly heated (110° C. oil bath temperature). At 94° C. the mixture foamed and turned black. The reaction was stopped. The resulting reaction mixture contained a solid and was not completely soluble in water.

Comparative Binder Composition-2

286 g of glucose monohydrate, 260 g of fructose and 286 g of L-lysine were mixed with 174 g of water and slowly heated (100° C. oil bath temperature). At 90° C. the mixture foamed and turned dark brown. The oil bath was removed for 10 minutes. The reaction was heated up again for 10 min to 100° C. until gas formation stopped. After cooling down to RT, the mixture was filled in bottles and stored at 60° C. for 48 h.

Comparative Binder Composition-3

235 g of hexamethylene diamine was dissolved in 730 g of water. 791 g of fructose and 853 g of glucose monohydrate were slowly added and stirred at room temperature for one hour.

Comparative Binder Composition-4

22.5 g of carboxymethylcellulose sodium salt (NaCMC, $M_w$ ca. 250,000) was dissolved in 600 g of water. 67.5 g of hexamethylene diamine and 360 g of glucose monohydrate were slowly added and stirred at room temperature for 24 h.

Example 1 (According to the Invention)

Note: The term "resinated chips" is generally used herein for the mixture of the chips with the binder composition and additionally added water.

In a mixer, a mixture of 499 g of Polylysine-2 solution (50 wt.-% in water), 149 g of a HMF solution (50 wt.-% HMF in water) and 100 g of water was sprayed onto 5.55 kg (5.40 kg dry weight plus 150 g water (from residual particle moisture content) of spruce core layer chips (moisture content 2.8%) while mixing. After addition of the mixture mixing was continued for 3 min. Certain information on the components used for preparing the binder composition of this example and on certain parameters measured of resulting single-layer chipboards are shown in Table 2 below.

Comparative Example 2*

Comparative Binder composition-1 was inhomogeneous. Spraying of Comparative Binder composition-1 onto the chips was not possible. Attempts to mix Comparative Binder composition-1 with the chips by pouring the binder composition onto the chips and stirring also failed to give an even mixture. Nevertheless, the inhomogeneous mixture was used for pressing. Certain information on the components used for preparing the binder composition of this example and on certain parameters measured of resulting single-layer chipboards are shown in Table 2 below.

Comparative Example 3*

In a mixer, a mixture of 404 g of Comparative Binder composition-2 and 244 g of water was sprayed onto 5.55 kg (5.40 kg dry weight plus 150 g water from residual particle moisture content) of spruce core layer chips (moisture content 2.8%) while mixing. 100 g of water was sprayed onto the mixture while mixing, to adjust the final moisture of the resinated chips. After addition of the water, mixing was continued for 3 min. Certain information on the components used for preparing the binder composition of this example and on certain parameters measured of resulting single-layer chipboards are shown in Table 2 below.

Comparative Example 4*

In a mixer, a mixture of 469 g of Comparative Binder composition-3 and 179 g of water was sprayed onto 5.55 kg (5.40 kg dry weight plus 150 g water from residual particle moisture content) of spruce core layer chips (moisture content 2.8%) while mixing. 100 g of water was sprayed onto the mixture while mixing to adjust the final moisture of the resinated chips. After addition of the water, mixing was continued for 3 min. Certain information on the components used for preparing the binder composition of this example and on certain parameters measured of resulting single-layer chipboards are shown in Table 2 below.

Comparative Example 5*

In a mixer, 816 g of Comparative Binder composition-4 was sprayed onto 5.51 kg (5.40 kg dry weight plus 105 g water from residual particle moisture content) of spruce core layer chips (moisture content 1.9%) while mixing. Thereafter, mixing was continued for 3 min. Certain information on the components used for preparing the binder composition of this example and on certain parameters measured of resulting single-layer chipboards are shown in Table 2 below.

Comparative Example 6*

In a mixer, a mixture of 499 g of Polylysine-2 solution (50 wt.-% in water), 164 g of glucose monohydrate (corresponding to 149 g of glucose) and 285 g of water was sprayed onto 5.51 kg (5.40 kg dry weight plus 105 g water from residual particle moisture content) of spruce core layer chips (moisture content 1.9%) while mixing. After addition of the mixture, mixing was continued for 3 min. Certain information on the components used for preparing the binder composition of this example and on certain parameters measured of resulting single-layer chipboards are shown in Table 2 below.

Pressing the Resinated Chips to Chipboards (Example 1 According to the Invention and Comparative Examples 2* to 6*)

Immediately after resination, 600 g of the chips/binder mixture were scattered into a 30×30 cm mold and pre-compacted under ambient conditions (0.4 $N/mm^2$). Subsequently, the pre-compacted chip mat thus obtained was removed from the mold, transferred into a hot press and pressed to a thickness of 10 mm to give a chipboard (temperature of the press plates 210° C., max. pressure 4 $N/mm^2$, pressing time 140 sec). Certain information on the components used for preparing the binder composition of this example and on certain parameters measured of resulting single-layer chipboards are shown in Table 2 below.

TABLE 2

Single-layered chipboards, 10 mm, with different binder compositions according to the invention and comparative examples, binder amount 6 wt.-% (solids/dry wood), press time factor 14 sec/mm

| Ex. | A Amino acid polymer or Comparative binder component | B HMF or comparative binder component glucose | Ratio[1) A:B | Density, [$kg/m^3$] | Internal bond strength, [$N/mm^2$] | 24 h swelling, [%] |
|---|---|---|---|---|---|---|
| 1 | Polylysine-2 | HMF | 77:23 | 623 | 0.47 | 62 |
| 2* | Comparative Binder-1 (Glucose/ fructose/lysine) | — | — | | no board | |
| 3* | Comparative Binder-2 (Glucose/ fructose/lysine) | — | — | 611 | 0.11 | n.q. |
| 4* | Comparative Binder-3 (Glucose/ fructose/HMDA) | — | — | 609 | 0.06 | n.q. |
| 5* | Comparative Binder-4 (Glucose/ HMDA/NaCMC) | — | — | 620 | 0.20 | n.q. |
| 6* | Polylysine-2 | Glucose | 77:23 | 619 | 0.31 | 80 |

*Comparative Example

[1)]ratio by weight n.p. = production of a chip board was not possible, since Comparative Binder-1 was inhomogeneous and could not be evenly distributed on the chips;

n.q. = not quantifiable since test sample fell to pieces within 24 h;

"no board" means that the resulting material after pressing was not a sound chipboard and showed fractures, blows and/or bursts.

The above results show that a binder according to the invention based on polylysine and polyaldehyde compound gives boards having improved properties, as compared to boards prepared by processes not according to the present invention, e.g. prepared with a comparative binder based on amine and sugar compound. A board prepared by a process 15 not according to the present invention but prepared with a binder comprising polylysine and a reducing sugar (here: glucose, cf. Ex. 6 in table 2 above) showed a lower internal bond strength and a higher 24 h swelling value than a board prepared by a process according to the present invention (cf. Ex. 1 in table 2 above).

The following examples 7 to 11 (all according to the invention) pertain to the manufacture of single-layered chipboards with Polylysine-2 and HMF and to different ways of application. Certain information on the components used for preparing the binder compositions of examples 7 to 11 and on certain parameters measured of resulting single-layer chipboards are shown in Table 3 below.

Example 7: Separate Application of the Binder Composition to the Wood Chips

In a mixer, 454 g of Polylysine-2 solution (50 wt.-% in water) was sprayed onto 5.55 kg (5.40 kg dry weight) of spruce core layer chips (moisture content 2.8%) while mixing. Subsequently, 194 g of a HMF solution (50 wt.-% HMF in water) was sprayed onto the mixture while mixing. Finally, 100 g of water was sprayed onto the mixture while mixing, to adjust the final moisture of the resinated chips.

Example 8: Separate Application of the Binder System to the Wood Chips

In a mixer, 194 g of a HMF solution (50 wt.-% HMF in water) was sprayed onto 5.55 kg (5.40 kg dry weight) of spruce core layer chips (moisture content 2.8%) while mixing. Subsequently, 454 g of Polylysine-2 solution (50 wt.-% in water) was sprayed onto the mixture. Finally, 100 g of water was sprayed onto the mixture while mixing to adjust the final moisture of the resinated chips. After addition of the water, mixing was continued for 3 min.

Examples 9 to 11: Mixed Application of the Binder Composition to the Wood Chips 2.00 kg of Polylysine-2 solution (50 wt.-% in water) and 857 g of a HMF solution (50 wt.-% HMF in water) were mixed by stirring for 1 min at 22° C. In a mixer 648 g of this mixture was sprayed either immediately after mixing or after a waiting time (stored in a closed box at 22° C.) as given in the Table 3, to 5.55 kg (5.40 kg dry weight) of spruce core layer chips (moisture content 2.8%) while mixing. Subsequently, 100 g of water was sprayed onto the mix while mixing to adjust the final moisture of the resinated chips. After addition of the water, mixing was continued for 3 min.

Examples 7 to 11: Pressing the Resinated Chips to Chipboards

Immediately after resination, 600 g of the chips/binder mixture were scattered into a 30×30 cm mold and pre-compacted under ambient conditions (0.4 N/mm$^2$). Subsequently, the pre-compacted chip mat thus obtained was removed from the mold, transferred into a hot press and pressed to a thickness of 10 mm to give a chipboard (temperature of the press plates 210° C., max pressure 4 N/mm$^2$, pressing time 140 sec).

TABLE 3

Single-layered chipboards, 10 mm, binder amount (components A + B): 6 wt.-% (solids/dry wood), press time factor = 14 sec/mm

| Example | A | B | Weight ratio A:B | Application | Waiting time, [h] | Density, [kg/m$^3$] | Internal bond, [N/mm$^2$] | 24 h swelling, [%] |
|---|---|---|---|---|---|---|---|---|
| 7 | PL-2 | HMF | 70:30 | sep. | — | 622 | 0.34 | 78 |
| 8 | PL-2 | HMF | 70:30 | sep.* | — | 621 | 0.35 | 80 |
| 9 | PL-2 | HMF | 70:30 | mix | 0.25 | 628 | 0.48 | 61 |
| 10 | PL-2 | HMF | 70:30 | mix | 1 | 625 | 0.47 | 61 |
| 11 | PL-2 | HMF | 70:30 | mix | 4 | 619 | 0.45 | 63 |

Waiting time = time between end of mixing of Polylysine-2 and HMF and start of spraying the binder composition mixture onto the chips, PL-2 = Polylysine-2 solution (50 wt.-% in water), for preparation see above;

n.d. = not determined sep. = separate application (first Polylysine-2, second HMF)

sep.* = separate application (first HMF, second Polylysine-2)

mix = application of a mixture of Polylysine-2 and HMF

The results in Table 3 above show that one can work with a mixture of amino acid polymer (e.g. polylysine) and polyaldehyde (e.g. HMF), or with a separate application of the two components onto the chips, while use of the mixture is preferred. The system furthermore tolerates a long waiting time between preparation of the mixture and application onto the chips.

Examples 12* to 18: Preparation of the Resinated Chips

In a mixer, a mixture of 499 g of L-lysine solution (50 wt.-% in water, Comparative Example 12*) or Polylysine solution (50 wt.-% in water, Polylysine-1 to Polylysine-6, Examples 13 to 18), 149 g of a HMF solution (50 wt.-% HMF in water) and 100 g of water was sprayed onto 5.54 kg (5.40 kg dry weight) of spruce core layer chips (moisture content 2.8%) while mixing. After addition of the mixture, mixing was continued for 3 min.

Examples 12* to 18: Pressing the Resinated Chips to Chipboards

Immediately after resination, 600 g of the chips/binder mixture were scattered into a 30×30 cm mold and pre-compacted under ambient conditions (0.4 N/mm$^2$). Subsequently, the pre-compacted chip mat thus obtained was removed from the mold, transferred into a hot press and pressed to a thickness of 10 mm to give a chipboard (temperature of the press plates 210° C., max. pressure 4 N/mm$^2$, pressing time 140 sec).

Certain information on the components used for preparing the binder compositions of example 12 (for comparison) and examples 13 to 18 (all according to the invention) and on certain parameters measured of resulting single-layer chipboards are shown in Table 4 below.

TABLE 4

| Single-layered chipboards, 10 mm, binder amount (A + B): 6 wt.-% (solids/dry wood), mixed application, press time factor 14 sec/mm | | | | | | |
|---|---|---|---|---|---|---|
| Example | A[1)] | $M_w$ of A [2)], [g/mol] | B | Weight ratio A:B | Density, [kg/m$^3$] | Internal bond, [N/mm$^2$] |
| 12* | L-Lysine | 146 | HMF | 77:23 | No board | |
| 13 | PL-1 | 1510 | HMF | 77:23 | 615 | 0.30 |
| 14 | PL-2 | 2010 | HMF | 77:23 | 626 | 0.47 |
| 15 | PL-3 | 2240 | HMF | 77:23 | 629 | 0.48 |
| 16 | PL-4 | 2740 | HMF | 77:23 | 625 | 0.53 |
| 17 | PL-5 | 3360 | HMF | 77:23 | 620 | 0.52 |
| 18 | PL-6 | 3690 | HMF | 77:23 | 626 | 0.50 |

*Comparative Example,
[1)]Amino acid polymer or comparative component
[2)] $M_w$ of the amino acid polymers are measured by size exclusion chromatography.
"PL-1" to "PL-6": solutions (50 wt.-% in water) of "polylysine-1" to "polylysine 6" (for preparation and properties see description and Table 1 above).

The above results in Table 4 show that different weight average molecular weights of the amino acid polymer (polylysines) work well, whereas amino acid (lysine) monomer does not work. There is an optimal range for the weight average molecular weight of the amino acid polymer (polylysine), at around 3000 g/mol.

The following examples 19 to 21 (all according to the invention) pertain to the manufacture of single-layered chipboards with Polylysine-2 and different weights of HMF. Certain information on the components used for preparing the binder compositions of examples 19 to 21 and on certain parameters measured of resulting single-layer chipboards are shown in Tables 5 and 6 below.

In a mixer, a mixture of an amount x1 of Polylysine-2 solution (50 wt.-% in water), an amount y1 of HMF solution (50 wt.-% HMF in water) and 100 g of water, was sprayed onto 5.55 kg (5.40 kg dry weight) of spruce core layer chips (moisture content 2.8%) while mixing. After addition of the mixture mixing was continued for 3 min.

TABLE 5

| Amount x1 of Polylysine-2 solution and amount y1 of HMF solution | | |
|---|---|---|
| Example | Amount of Polylysine-2 solution (50 wt.-% in water) x1 [g] | Amount of HMF solution (50 wt.-% in water) y1 [g] |
| 19 | 583 | 64.5 |
| 20 | 518 | 130 |
| 21 | 454 | 194 |

Examples 19 to 21: Pressing the Resinated Chips to Chipboards

Immediately after resination, 600 g of the chips/binder mixture were scattered into a 30x30 cm mold and pre-compacted under ambient conditions (0.4 N/mm$^2$). Subsequently, the pre-compacted chip mat thus obtained was removed from the mold, transferred into a hot press and pressed to a thickness of 10 mm to give a chipboard (temperature of the press plates 210° C., max pressure 4 N/mm$^2$, pressing time 140 sec).

TABLE 6

| Single-layered chipboards, 10 mm, binder amount (components A + B): 6 wt.-% (solids/dry wood), mixed application, press time factor 14 sec/mm | | | | | |
|---|---|---|---|---|---|
| Example | Component A[1)] | B | Weight ratio A:B | Density, [kg/m$^3$] | Internal bond, [N/mm$^2$] |
| 19 | Polylysine-2 | HMF | 90:10 | 601 | 0.31 |
| 20 | Polylysine-2 | HMF | 80:20 | 614 | 0.41 |
| 21 | Polylysine-2 | HMF | 70:30 | 623 | 0.47 |

[1)]Amino acid polymer
The above results in Table 6 show that the ratio of amino acid polymer (polylysine) to polyaldehyde (HMF) may be varied. Preferred is a ratio of less than 70:30, but preferably not less than 50:50.

The following Examples 22 to 27 (all according to the invention) pertain to the manufacture of single-layered chipboards with Polylysine-2 and different weights of HMF (by pressing in a high-frequency press). Certain information on the components used for preparing the binder compositions of examples 22 to 27 and on certain parameters measured of resulting single-layer chipboards are shown in Tables 7 and 8 below.

In a mixer, a mixture of an amount x2 of Polylysine-2 solution (50 wt.-% in water), an amount y2 of HMF solution (50 wt.-% HMF in water) and 100 g of water, was sprayed onto 5.55 kg (5.40 kg dry weight) of spruce core layer chips (moisture content 2.8%) while mixing. After addition of the mixture, mixing was continued for 3 min.

TABLE 7

| amount x2 of Polylysine-2 solution and amount y2 of HMF solution | | |
|---|---|---|
| Example | Amount of Polylysine-2 solution (50 wt.-% in water) x2 [g] | Amount of HMF solution (50 wt.-% in water) y2 [g] |
| 22 | 583 | 64.5 |
| 23 | 518 | 130 |
| 24 | 486 | 162 |
| 25 | 454 | 194 |
| 26 | 421 | 227 |
| 27 | 389 | 259 |

Examples 22 to 27: Pressing the Resinated Chips to Chipboards in a High-Frequency Press Immediately after resination, 600 g of the resinated chips were scattered into a 30x30 cm mold and pre-compacted under ambient conditions (0.4 $N/mm^2$). Subsequently, the prepressed chip mat thus obtained was removed from the mold. For temperature monitoring a temperature sensor (GaAs chip) was introduced into the center of said pre-compacted chip mat. Nonwoven separators were then provided to the upper and lower side of the pre-compacted chip mat. The pre-compacted chip mat was inserted in a HLOP 170 press from Hoefer Presstechnik GmbH, whereby a birch plywood (thickness 6 mm) was placed between the nonwoven separator and the press plate on each side of the mat. The pre-compacted chip mat was then compacted to 10 mm thickness in the press within a period of 2 s, and then heated by applying a high-frequency electrical field (27.12 MHz, anode current 2.5 A) while the press was remaining closed. When the target temperature 130° C. was reached in the center of the pressed mat (130° C. was reached after 75±15 sec), the press was opened.

TABLE 8

Single-layered chipboards (high-frequency press), 10 mm, binder amount (components A + B): 6 wt.-% (solids/dry wood), mixed application

| Example | Component A[1)] | HMF | Weight ratio A:HMF | Density, [$kg/m^3$] | Internal bond, [$N/mm^2$] |
|---|---|---|---|---|---|
| 22 | Polylysine-2 | HMF | 90:10 | 603 | 0.40 |
| 23 | Polylysine-2 | HMF | 80:20 | 613 | 0.52 |
| 24 | Polylysine-2 | HMF | 75:25 | 621 | 0.58 |
| 25 | Polylysine-2 | HMF | 70:30 | 620 | 0.59 |
| 26 | Polylysine-2 | HMF | 65:35 | 623 | 0.56 |
| 27 | Polylysine-2 | HMF | 60:40 | 618 | 0.49 |

[1)]Amino acid polymer

The invention claimed is:

1. A process for producing a lignocellulosic composite comprising one or more lignocellulosic composite layers, comprising at least the following steps:
S1) providing or preparing a mixture, at least comprising:
lignocellulosic particles and
a binder composition, comprising as components at least:
c1) one or more amino acid polymers having two or more primary amino groups, comprising one or more polylysines and
c2) one or more polyaldehyde compounds, selected from the group consisting of compounds having two or more aldehyde groups and compounds having tautomers having two or more aldehyde groups;
S2) compacting the mixture from step S1) to receive a compacted mixture, and
S3) applying heat and optionally pressure to the compacted mixture from step S2), so that the binder of the binder composition hardens and a lignocellulosic composite results.

2. The process according to claim 1, wherein the one or more amino acid polymers of component c1) of the binder composition comprise one or more polylysines, wherein the one or more polylysines
have a weight-average molecular weight $M_w$ of >800 g/mol; and/or
have a weight-average molecular weight $M_w$ of ≤10000 g/mol; and/or
have a weight-average molecular weight $M_w$ in the range of 800 g/mol ≤Mw ≤10000 g/mol; and/or
comprise as monomers integrated in their polymer structure at least 85 wt.-% of lysine monomers.

3. The process according to claim 1, wherein the one or one of the more or all of the more polyaldehyde compounds of component c2) of the binder composition are selected from the group consisting of oxidized starch, glyoxal, dialdehyde cellulose, propanedial, butanedial, pentanedial, hexanedial, furan-2,5-dicarbaldehyde, 5-(hydroxymethyl) furan-2-carbaldehyde (HMF), 3-hydroxy-2-oxo-propanal, and mixtures thereof.

4. The process according to claim 1, wherein the mixture further comprises one or more alpha-hydroxy carbonyl compounds.

5. The process according to claim 4, wherein the one or more alpha-hydroxy carbonyl compounds are selected from the group consisting of glycolaldehyde, glyceraldehyde, 1,3-dihydroxyacetone, hydroxyacetone, arabinose, xylose, glucose, mannose, fructose, saccharose, and mixtures thereof.

6. The process according to claim 1, wherein
the ratio of (i) the total weight of the one or more amino acid polymers of component c1) of the binder composition: (ii) the total weight of the one or more polyaldehyde compounds of component c2) of the binder composition is in the range of 60:40 to 95:5,
and/or
the molar ratio of (i) the primary amino groups provided by the one or more amino acid polymers of component c1) of the binder composition to (ii) the aldehyde groups provided by the one or more polyaldehyde compounds of component c2) of the binder composition is in the range of 0.1 to 1.2.

7. The process according to claim 1, wherein the binder composition provided or prepared in step S1) further comprises a carrier liquid.

8. The process according to claim 7, wherein component c1), the one or more amino acid polymers, is present in the binder composition in a total amount in the range of from ≥20 to ≤50 wt.-%, relative to the totalized weight of components c1) to c2) and carrier liquid;
and/or
component c2), the one or more polyaldehyde compounds, is present in the binder composition in a total amount in the range of from ≥3 to ≤20 wt.-%, relative to the total weight of components c1) to c2) and carrier liquid;
and/or
the pH-value of the binder composition is in the range of from 10 to 14.

9. The process according to claim 1, wherein in the mixture provided or prepared in step S1) of the process,
the total amount of component c1), the one or more ammo acid polymers of the binder composition, and of component c2), the one or more polyaldehyde compounds of the binder composition,
is in the range of from ≥3 to ≥8 wt.-%, relative to the total amount of the lignocellulosic particles in an oven-dry state of the mixture.

10. The process according to claim 1, wherein the mixture in step S1) is prepared by providing or preparing in a first step S1-1) the binder composition comprising at least components c1) and c2) and in a second step S1-2), contacting, the binder composition provided or prepared in step S1-1) with the lignocellulosic particles.

11. The process according to claim 1, wherein the lignocellulosic composite is a lignocellulosic board selected from the group consisting of:
high-density fiberboard (HDF);
medium-density fiberboard (MDF);
low-density fiberboard (LDF);
wood fiber insulation board;

oriented strand board (OSB);
chipboard; and
natural fiber board,
wherein the lignocellulosic board is a single-layer lignocellulosic board or multilayer lignocellulosic board.

12. The process according to claim 1, wherein the process of producing a lignocellulosic composite comprises one, two, three, more than three, or all of the following steps:

preparing a layer of the mixture provided or prepared in step S1), and in step S2) compacting this layer, preparing a multilayer lignocellulosic composite comprising one or more lignocellulosic composite layers, providing or preparing at least a first and a second individual mixture, and using said first and second individual mixtures for making a first and a second layer of the multilayer lignocellulosic composite, preparing a multilayer lignocellulosic composite, preparing two or more layers, each layer comprising lignocellulosic particles and a binder, wherein in the two or more layers the lignocellulosic particles and/or the binders are the same or different, compacting, in step 2), the mixture in one or more two stages, during or after compacting in step S2), pre-heating the mixture, heating in step S3) in such way, that during step 3) or at the end of step S3) the temperature in the center of formed lignocellulosic composite may be at least 80° C., and applying a pressure in the range of from of 0.1 to 10 MPa in step S3) to the compacted mixture from step S2).

13. The process according to claim 12, wherein the heating in step S3) comprises applying a high-frequency electrical field.

14. A lignocellulosic composite, obtainable or obtained according to a process according to claim 1, or construction product comprising such lignocellulosic composite.

15. The lignocellulosic composite according to claim 14, wherein the lignocellulosic composite is a lignocellulosic board selected from the group consisting of high-density fiberboard (HDF)
medium-density fiberboard (MDF)
low-density fiberboard (LDF)
wood fiber insulation board
oriented strand board (OSB)
chipboard, and
natural fiber board.

16. A binder composition or mixture for producing a lignocellulosic composite, comprising as components at least:

c1) one or more amino acid polymers having two or more primary amino groups, comprising one or more polylysines, and c2) one or more polyaldehyde compounds, selected from the group consisting of compounds having two or more aldehyde groups and compounds having tautomers having two or more aldehyde groups, wherein the ratio of (i) the total weight of the one or more amino acid polymers of component c1) of the binder composition: (ii) the total weight of the one or more polyaldehyde compounds of component c2) of the binder composition is in the range of 60:40 to 95:5.

17. The binder composition according to claim 16, wherein the one or more amino acid polymers of component c1) of the binder composition comprise one or more polylysines, wherein the one or more polylysines have a weight-average molecular weight $M_w$ of ≥800 g/mol; and/or have a weight-average molecular weight $M_w$ of ≤10000 g/mol; and/or have a weight-average molecular weight $M_w$ in the range of 800 g/mol $\leq M_w \leq$ 10000 g/mol;

and/or comprise as monomers integrated in their polymer structure at least 85 wt.-% of lysine monomers.

18. The binder composition according to claim 16, wherein the one or one of the more or all of the more polyaldehyde compounds of component c2) of the binder composition are selected from the group consisting of oxidized starch, glyoxal, dialdehyde cellulose, propanedial, butanedial, pentanedial, hexanedial, furan-2,5-dicarbaldehyde, 5-(hydroxymethyl) furan-2-carbaldehyde (HMF), 3-hydroxy-2-oxo-propanal, and mixtures thereof.

19. The binder composition according to claim 16, wherein the mixture further comprises one or more alpha-hydroxy carbonyl compounds, wherein the one or more alpha-hydroxy carbonyl compounds are selected from the group consisting of glycolaldehyde, glyceraldehyde, 1,3-dihydroxyacetone, hydroxyacetone, arabinose, xylose, glucose, mannose, fructose, saccharose, and mixtures thereof.

20. The binder composition according to claim 16, wherein the ratio of (i) the total weight of the one or more amino acid polymers of component c1) of the binder composition: (ii) the total weight of the one or more polyaldehyde compounds of component c2) of the binder composition is in the range of 65:35 to 90:10, and/or the molar ratio of (i) the primary amino groups provided by the one or more amino acid polymers of component c1) of the binder composition to (ii) the aldehyde groups provided by the one or more polyaldehyde compounds of component c2) of the binder composition is in the range of 0.1 to 1.2.

* * * * *